Patented Oct. 23, 1945

2,387,517

UNITED STATES PATENT OFFICE 2,387,517

PROCESS FOR COPOLYMERIZATION

Charles A. Kraus, Providence, R. I., assignor, by mesne assignments, to Jasco, Incorporated, a corporation of Louisiana No Drawing. Application November 8, 1940, Serial No. 364,845

11 Claims. (Cl. 260—93)

This invention relates to the manufacture of polymerized products, particularly by the copolymerization of olefins with various unsaturated compounds.

This application is a continuation-in-part of my copending application Serial Number 238,561, filed November 3, 1938, now issued as Patent Number 2,220,930.

It has been proposed to form substantially saturated, linear, aliphatic hydrocarbons, having a molecular weight of 1,000 and upward, by the polymerization of iso-olefins and by the copolymerization of iso-olefins with diolefins at a temperature well below ordinary temperatures, in the presence of a metal halide catalyst, such as aluminum chloride. A catalyst of the type of aluminum chloride, however, is fairly insoluble in hydrocarbon oils, particularly at low temperatures. Such a catalyst may be introduced into the oil in the form of a solid, but this process involves difficulties in effecting good contact with the liquid before polymerization takes place. Catalysts of the type proposed thus present disadvantages in controlling the reaction and in arriving at conditions which may be necessary to secure desired polymers without waste of valuable catalytic material and undue contamination of the product.

It has now been found that the halides of certain members of the aluminum sub-group of Group III of the periodic system of elements, specifically, aluminum, gallium and boron, having a part of their halogen atoms substituted by monovalent hydrocarbon groups, are suitable catalysts for the low temperature polymerization of olefin hydrocarbons and copolymerization of olefin hydrocarbons with other unsaturated materials, and that these compounds have the particular advantage of being liquids and, owing to the presence of the organic radicals, of being somewhat oil-soluble. These properties make it possible to introduce the catalyst into the hydrocarbon in finely divided form and to effect its immediate dispersion in the oil. The substituting hydrocarbon groups may be any monovalent groups, such as alkyl, aryl, aralkyl, alkyl-aryl, and various other types of cyclic radicals. The groups of compounds contemplated in the present invention may be generically represented by the formula $$MX_mR_n$$

where M represents aluminum, gallium or boron, X represents a halogen, R represents a monovalent hydrocarbon radical, $m$ and $n$ represent integers from one to two, inclusive, and $m+n=3$.

Examples of compounds of this general class are dimethylaluminum chloride, diethylaluminum chloride, methylaluminum dichloride, ethylaluminum dichloride, diphenylaluminum chloride, dibutylboron chloride, butylboron dichloride, dimethylgallium chloride and methylgallium dichloride.

In addition to the above described compounds, complexes of these compounds with aliphatic compounds or with inorganic halides or with ammonia or substituted ammonias are suitable catalysts for the purposes of the present invention. Examples of such complexes are methylaluminum dichloride-sodium chloride $$(Al(CH_3)Cl_2.NaCl)$$

methylaluminum dichloride-nitromethane $$(Al(CH_3)Cl_2.CH_3NO_2)$$

and dimethylaluminum chloride-dimethylamine $$(Al(CH_3)_2Cl.NH(CH_3)_2)$$

The present invention relates particularly to the formation of copolymers, and it has been found that the compounds described above are suitable generally as catalysts for the copolymerization of olefins and substituted olefins having the structure $$R=CH_2$$

where R is an aliphatic radical, with other unsaturated materials. The olefins may be of the straight chain or branched type, and include particularly the lower molecular weight olefins, such as isobutylene, 2-methyl-1-butene, and the like. The catalysts are equally suitable for copolymerization processes involving substituted olefins, such as, for example, olefins of the above formula in which one or more of the hydrogen atoms in the R group are substituted with halogen atoms. An example of such a substituted olefin is 2-methyl-3-chlorpropene. The olefins and substituted olefins of the type described may be copolymerized, according to the present invention, with a great variety of other unsaturated materials. Such materials include normal olefins, substituted olefins, diolefins, polyolefins, acetylenic compounds and other unsaturated hydrocarbons, both straight chain and cyclic as well as various naturally occurring products containing large proportions of unsaturated materials. Examples of such suitable materials include butadiene, dimethylbutadiene, isoprene, vinyl acetylene, dimethallyl, styrene, amylene, cyclopentadiene, terpenes, drying oils derived from petroleum hydrocarbons, etc. The invention is particularly adapted to the formation of curable rubber-like products by the copolymerization of isobutylene with low molecular weight diolefins, especially those having from four to six carbon atoms.

The catalytic polymerization reactions, according to the present invention, are carried out at temperatures below ordinary room temperature and generally below 0° C., and when very high molecular weight products are desired the temperature is preferably maintained below —50° C. Products having molecular weights ranging from 1,000 or 3,000 up to 300,000, or even higher, may be formed by the herein described method.

It has been found that the catalyst is consumed in the process of polymerization, and that the amount of polymer formed in a given reaction is roughly proportional to the amount of catalyst added, which, in general, is from about 0.1% to about 5%, preferably about .05%, of the total materials reacted. The catalyst may, to a large extent at least, be removed by hydrolysis, as in treating with hot water or with dilute acid or with aqueous or alcoholic alkali solutions. It is possible that the catalyst or derivatives of it are entrained in the material as the reaction proceeds and is not completely removed in the usual process of washing to remove unreacted catalytic material nor in the hydrolysis treatment. Owing to the relatively small amount of catalyst present in the material, however, the properties of the polymer are not appreciably affected by its presence, and the product formed possesses substantially the same properties as that formed by the action of other catalysts.

The hydrocarbon material to be polymerized should be free from ingredients which tend to poison catalytic reactions, such as organic sulfur compounds.

In carrying out the copolymerization reactions according to the present invention, the materials to be copolymerized are preferably first well mixed in the proportions desired and placed in a reaction vessel and cooled to the desired temperature, for example, by adding powdered dry ice directly to the reacting material. The catalyst, preferably pre-cooled, may then be added very gradually, the reaction taking place immediately. The catalyst should be introduced in such a way as to secure immediate wide distribution in the hydrocarbon, such as by introducing it dropwise into the vigorously stirred liquid, or by other appropriate means. It has been found to be more convenient, however, to add the catalyst in the form of a solution in a solvent, such as methyl chloride or ethyl chloride, carbon tetrachloride, liquid propane, liquid butane, etc., in order to avoid the danger of any contact of the catalyst with moisture, air or oxygen. Since the reaction is exothermic, it may be desirable, if a considerable quantity of the copolymer is to be formed, to maintain the reaction mixture at a low temperature by adding to this mixture a refrigerant, such as liquid ethane or propane, which will absorb the heat of reaction during the process of boiling off. In order to avoid the disadvantage of too great or permanent dilution of the reaction mixture, only enough of such refrigerant mixture should be added as will on boiling away absorb the expected heat of reaction. In some cases, where polymerization does not take place too rapidly, the catalyst may be first added to the less active reactant, and the mixture thus formed is then quickly added to the more active reactant.

The products formed in the reaction are usually plastic, rubber-like resins, depending on their molecular weight and chemical constitution, and they may be freed from unpolymerized material or reacted catalyst by any convenient means, such as by washing with water and kneading in a kneading machine.

The formation of a copolymerized product by the method of the present invention may be illustrated by the following example:

*Example*

A mixture of about equal parts of methylaluminum dichloride and dimethylaluminum chloride is prepared by the method of Hnizda and Kraus, described in Journ. Amer. Chem. Soc., vol. 60, page 2276 (1938), the product being a clear colorless liquid, spontaneously inflammable in air. About one part by weight of this mixture is dissolved in 100 parts by weight of methyl chloride, cooled to about —78° C. by adding powdered dry ice, and added gradually with stirring to a reaction mixture comprising 160 parts by weight of isobutylene, 40 parts by weight of butadiene and 400 parts by weight of liquid ethylene. A solid copolymer product is formed and precipitated immediately. The weight of the product is approximately equal to 100 times the weight of catalyst added. The product, after washing, is a colorless, plastic, somewhat tacky, rubber-like material, having a molecular weight above 10,000. The product is readily soluble in all aliphatic hydrocarbon solvents, as well as in halogenated aliphatic hydrocarbons, such as carbon tetrachloride, ethylene dichloride and the like; but it is generally insoluble in organic oxygen-containing compounds.

The product may be suitably cured with sulfur, for example, by compounding 100 parts by weight of the same with 5 parts of zinc oxide, 3 parts of stearic acid, 2 parts of sulfur and one part of tetramethyl thiuram disulfide and curing at 155° C. for one hour in a mold under a mechanical pressure of about 1000 pounds. The product, like other cured rubber-like materials, is no longer soluble in hydrocarbons and like solvents.

The description of the method of carrying out the present invention and accompanying example relate to a batch process. The invention is not limited to such a process, however, as it is equally adapted to being carried out in a continuous process, in which the mixture of unpolymerized unsaturated materials and preferably also the catalyst are pre-cooled and continuously brought into contact, while the polymerized product is continuously removed, means being provided for maintaining continuously the desired low temperature in the reaction zone.

It is not intended that the invention should be limited to any specific examples which are presented here solely for the purpose of illustration, but that it is to be limited only by the terms of the appended claims.

I claim:

1. The method of forming a copolymer by the copolymerization of a compound of the formula $$R = CH_2$$

where R is an aliphatic radical, with an unsaturated hydrocarbon which comprises contacting a mixture of the materials to be copolymerized in liquid phase, at a temperature below ordinary room temperature, with a compound having the formula $$MX_mR_n$$

where M represents a member of the class consisting of aluminum, gallium and boron, X represents a halogen, R represents a monovalent hydrocarbon radical, m and n each represent an integer from 1 to 2, inclusive, and $m+n=3$.

2. The method of forming a copolymer by the copolymerization of an olefin of the formula $$R=CH_2$$

where R is an alkyl radical, with an unsaturated hydrocarbon which comprises contacting a mixture of the materials to be copolymerized in liquid phase, at a temperature below ordinary room temperature, with a compound having a formula $$AlX_mR_n$$

where X represents a halogen, R represents a monovalent hydrocarbon radical, m and n each represent an integer of from 1 to 2, inclusive, and $m+n=3$.

3. The method of forming a copolymer by the copolymerization of an olefin of the formula $$R=CH_2$$

where R is an alkyl radical, with an unsaturated hydrocarbon which comprises contacting a mixture of the materials to be copolymerized in liquid phase, at a temperature below ordinary room temperature, with a compound having the formula $$MCl_mR_n$$

where M represents a member of the class consisting of aluminum, gallium and boron, R represents a monovalent hydrocarbon radical, m and n each represent an integer from 1 to 2, inclusive, and $m+n=3$.

4. The method of forming a copolymer by the copolymerization of an olefin of the formula $$R=CH_2$$

where R is an aliphatic radical, with an unsaturated hydrocarbon which comprises contacting a mixture of the materials to be copolymerized in liquid phase, at a temperature below ordinary room temperature, with a compound having the formula $$AlCl_mR_n$$

where R represents a monovalent alkyl radical, m and n each represent an integer from 1 to 2, inclusive, and $m+n=3$.

5. The method of forming a copolymer having a molecular weight of at least 1000 by the copolymerization of an olefin having the formula $$R=CH_2$$

where R is an alkyl radical, with a diolefin, which comprises contacting a mixture of the said olefin and said diolefin, in a liquid phase at a temperature below ordinary room temperature, with a compound having the formula $$AlCl_m(CH_3)_n$$

where m and n each represent an integer from 1 to 2, inclusive, and $m+n=3$.

6. The method of forming a copolymer having a molecular weight of at least 1000 from a mixture of isobutylene and a diolefin having from four to six carbon atoms which comprises contacting said mixture at a temperature below ordinary room temperature with a compound having the formula $$MCl_mR_n$$

where M represents a member of the class consisting of aluminum, gallium and boron, R represents a monovalent hydrocarbon radical, m and n each represent an integer from 1 to 2, inclusive, and $m+n=3$.

7. The method of forming a copolymer having a molecular weight of at least 1000 from a mixture of isobutylene and butadiene which comprises contacting said mixture at a temperature below 0° C. with about 0.1% to about 5% by weight of a compound having the formula $$AlCl_mR_n$$

where R represents a monovalent alkyl radical, m and n each represent an integer from 1 to 2, inclusive, and $m+n=3$.

8. The method of forming a copolymer having a molecular weight of at least 1000 from a mixture of isobutylene and butadiene which comprises contacting said mixture at a temperature below 0° C. with a compound having the formula $$AlCl_m(CH_3)_n$$

where m and n each represent an integer from 1 to 2, inclusive, and $m+n=3$.

9. The method of forming a copolymer having a molecular weight of at least 1000 from a mixture of isobutylene and butadiene which comprises contacting said mixture at a temperature below 0° C. with a small amount of a mixture of approximately equal parts of dimethylaluminum chloride and methylaluminum dichloride.

10. The method of forming a copolymer having a molecular weight of at least 1000 from a mixture of isobutylene and butadiene which comprises contacting said mixture at a temperature not higher than −50° C. with a solution of a compound having the formula $$AlCl_mR_n$$

where R represents a monovalent alkyl radical, m and n each represent an integer from 1 to 2, inclusive, and $m+n=3$.

11. The method of forming a copolymer having a molecular weight above 10,000 which comprises dissolving about 1 part by weight of a mixture of approximately equal parts of dimethylaluminum chloride and methylaluminum dichloride in 100 parts by weight of methyl chloride, cooling the solution thus formed to about −78° C., and adding the said solution gradually to a mixture comprising about 160 parts by weight of isobutylene, 40 parts by weight of butadiene and 400 parts by weight of liquid ethylene.

CHARLES A. KRAUS.